(12) United States Patent
Varthakavi et al.

(10) Patent No.: US 9,263,045 B2
(45) Date of Patent: Feb. 16, 2016

(54) MULTI-MODE TEXT INPUT

(75) Inventors: Mohan Varthakavi, Sammamish, WA (US); Jayaram N M Nanduri, Sammamish, WA (US); Nikhil Kothari, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 896 days.

(21) Appl. No.: 13/109,023

(22) Filed: May 17, 2011

(65) Prior Publication Data

US 2012/0296646 A1 Nov. 22, 2012

(51) Int. Cl.
*G10L 15/00* (2013.01)
*G10L 15/26* (2006.01)

(52) U.S. Cl.
CPC ...................... *G10L 15/26* (2013.01)

(58) Field of Classification Search
CPC . G10L 15/265; G10L 15/22; H04M 2201/40; H04M 2201/60; G06F 17/30746
USPC ........................................................ 704/235
See application file for complete search history.

(56) References Cited

U.S. PATENT DOCUMENTS

| | | | | |
|---|---|---|---|---|
| 5,165,095 | A * | 11/1992 | Borcherding | 379/88.03 |
| 5,600,765 | A * | 2/1997 | Ando et al. | 345/668 |
| 6,018,736 | A * | 1/2000 | Gilai et al. | |
| 6,112,174 | A * | 8/2000 | Wakisaka et al. | 704/251 |
| 6,154,526 | A * | 11/2000 | Dahlke et al. | 379/88.03 |
| 6,501,833 | B2 * | 12/2002 | Phillips et al. | 379/88.07 |
| 6,674,426 | B1 * | 1/2004 | McGee et al. | 345/173 |
| 6,868,383 | B1 * | 3/2005 | Bangalore | G06K 9/00355 704/251 |
| 6,983,307 | B2 * | 1/2006 | Mumick et al. | 709/205 |
| 6,999,874 | B2 * | 2/2006 | Seto et al. | 701/539 |
| 7,197,331 | B2 * | 3/2007 | Anastasakos et al. | 455/557 |
| 7,269,563 | B2 * | 9/2007 | Douros | 704/275 |
| 7,318,031 | B2 * | 1/2008 | Bantz et al. | 704/251 |
| 7,363,027 | B2 * | 4/2008 | Hon | G06F 17/30899 455/414.1 |
| 7,415,409 | B2 * | 8/2008 | Simoneau et al. | 704/243 |
| 7,434,158 | B2 * | 10/2008 | Chi | G06F 17/30905 704/E17.009 |
| 7,555,725 | B2 * | 6/2009 | Abramson et al. | 715/781 |

(Continued)

OTHER PUBLICATIONS

Siegemund, et al., "Using Digital Cameras for Text Input on Mobile Devices", Retrieved at <<http://ieeexplore.ieee.org/stamp/stamp.jsp?tp=&arnumber=4144763>>, Fifth Annual IEEE International Conference on Pervasive Computing and Communications, Mar. 19-23, 2007, pp. 8.

(Continued)

*Primary Examiner* — Pierre-Louis Desir
*Assistant Examiner* — Fariba Sirjani
(74) *Attorney, Agent, or Firm* — Steven J. Spellman; Danielle Johnston-Holmes; Micky Minhas (57) ABSTRACT

Concepts and technologies are described herein for multi-mode text input. In accordance with the concepts and technologies disclosed herein, content is received. The content can include one or more input indicators. The input indicators can indicate that user input can be used in conjunction with consumption or use of the content. The application is configured to analyze the content to determine context associated with the content and/or the client device executing the application. The application also is configured to determine, based upon the content and/or the contextual information, which input device to use to obtain input associated with use or consumption of the content. Input captured with the input device can be converted to text and used during use or consumption of the content.

20 Claims, 6 Drawing Sheets (56) References Cited

U.S. PATENT DOCUMENTS

| | | | |
|---|---|---|---|
| 7,610,547 B2 | 10/2009 | Wang et al. | |
| 7,640,160 B2* | 12/2009 | Di Cristo et al. | 704/257 |
| 7,664,649 B2 | 2/2010 | Jost et al. | |
| 7,787,693 B2 | 8/2010 | Siegemund | |
| 7,805,299 B2* | 9/2010 | Coifman | 704/235 |
| 7,853,582 B2* | 12/2010 | Gopalakrishnan | G06F 17/30029 379/88.13 |
| 7,869,998 B1* | 1/2011 | Di Fabbrizio et al. | 704/251 |
| 7,945,566 B2* | 5/2011 | James et al. | 707/723 |
| 8,010,286 B2* | 8/2011 | Templeton et al. | 701/412 |
| 8,176,438 B2* | 5/2012 | Zaman et al. | 715/815 |
| 8,213,917 B2* | 7/2012 | Anderl | 455/414.4 |
| 8,219,406 B2* | 7/2012 | Yu et al. | 704/275 |
| 8,255,218 B1* | 8/2012 | Cohen et al. | 704/248 |
| 8,332,224 B2* | 12/2012 | Di Cristo et al. | 704/257 |
| 8,355,915 B2* | 1/2013 | Rao | 704/244 |
| 8,428,654 B2* | 4/2013 | Oh et al. | 455/563 |
| 8,442,964 B2* | 5/2013 | Safadi et al. | 707/705 |
| 8,543,394 B2* | 9/2013 | Shin | 704/235 |
| 8,571,866 B2* | 10/2013 | Melamed et al. | 704/244 |
| 8,635,068 B2* | 1/2014 | Pulz et al. | 704/257 |
| 8,700,392 B1* | 4/2014 | Hart et al. | 704/231 |
| 8,862,475 B2 | 10/2014 | Ativanichayaphong et al. | 704/270.1 |
| 2002/0107696 A1* | 8/2002 | Thomas et al. | 704/275 |
| 2002/0169604 A1* | 11/2002 | Damiba et al. | 704/231 |
| 2003/0046401 A1* | 3/2003 | Abbott et al. | 709/228 |
| 2003/0055651 A1* | 3/2003 | Pfeiffer et al. | 704/270.1 |
| 2003/0093419 A1* | 5/2003 | Bangalore | G01C 21/3664 |
| 2003/0125948 A1* | 7/2003 | Lyudovyk | 704/257 |
| 2004/0006480 A1* | 1/2004 | Ehlen | G10L 15/22 704/276 |
| 2004/0243415 A1* | 12/2004 | Commarford et al. | 704/275 |
| 2005/0027538 A1* | 2/2005 | Halonen | H04M 1/72561 704/275 |
| 2005/0149337 A1* | 7/2005 | Asadi et al. | 704/277 |
| 2005/0251746 A1* | 11/2005 | Basson et al. | 715/708 |
| 2006/0247925 A1* | 11/2006 | Haenel et al. | 704/215 |
| 2007/0005363 A1* | 1/2007 | Cucerzan | H04W 4/02 704/256 |
| 2007/0043758 A1* | 2/2007 | Bodin et al. | 707/102 |
| 2007/0124507 A1* | 5/2007 | Gurram et al. | 710/1 |
| 2007/0136222 A1* | 6/2007 | Horvitz | 706/45 |
| 2007/0156853 A1* | 7/2007 | Hipp et al. | 709/219 |
| 2007/0168191 A1* | 7/2007 | Bodin et al. | 704/257 |
| 2007/0266087 A1 | 11/2007 | Hamynen | |
| 2008/0118162 A1 | 5/2008 | Siegemund | |
| 2008/0255843 A1* | 10/2008 | Sun et al. | 704/250 |
| 2008/0300871 A1* | 12/2008 | Gilbert | 704/233 |
| 2008/0316888 A1* | 12/2008 | Reifman | 369/69 |
| 2009/0144056 A1* | 6/2009 | Aizenbud-Reshef et al. | 704/228 |
| 2009/0285444 A1 | 11/2009 | Erol et al. | |
| 2009/0299745 A1* | 12/2009 | Kennewick | G10L 15/32 704/257 |
| 2009/0315740 A1 | 12/2009 | Hildreth et al. | |
| 2009/0319266 A1* | 12/2009 | Brown | G06F 9/4443 704/235 |
| 2010/0066684 A1* | 3/2010 | Shahraray et al. | 345/173 |
| 2010/0105364 A1* | 4/2010 | Yang | 455/414.1 |
| 2010/0169246 A1* | 7/2010 | Jang | B25J 9/161 706/12 |
| 2010/0217604 A1* | 8/2010 | Baldwin | G06Q 30/02 704/275 |
| 2010/0280983 A1* | 11/2010 | Cho | G10L 15/22 706/46 |
| 2010/0312469 A1* | 12/2010 | Chen | 701/207 |
| 2011/0022393 A1* | 1/2011 | Waller et al. | 704/270 |
| 2011/0074693 A1* | 3/2011 | Ranford et al. | 345/173 |
| 2011/0093264 A1* | 4/2011 | Gopalakrishnan | G06F 17/30247 704/235 |
| 2011/0093271 A1* | 4/2011 | Bernard | G06F 17/2785 704/257 |
| 2011/0153324 A1* | 6/2011 | Ballinger | G10L 15/30 704/235 |
| 2011/0282664 A1* | 11/2011 | Tanioka et al. | 704/235 |
| 2012/0296646 A1* | 11/2012 | Varthakavi et al. | 704/235 |

OTHER PUBLICATIONS

Liu, et al., "Multiscale Edge-Based Text Extraction from Complex Images", Retrieved at <<http://ieeexplore.ieee.org/stamp/stamp.jsp?tp=&arnumber=4036951>>, Proceedings of the 2006 IEEE International Conference on Multimedia and Expo, ICME, Jul. 9-12, 2006, pp. 1721-1724.

Chang, et al., "Efficient Web Search on Mobile Devices with Multi-Modal Input and Intelligent Text Summarization", Retrieved at <<http://www2002.org/CDROM/poster/190.pdf>>, In Proceedings of the eleventh international World Wide Web conference, 2002, pp. 4.

Mueller, et al., "Interactive Multimodal User Interfaces for Mobile Devices", Retrieved at <<http://ieeexplore.ieee.org/stamp/stamp.jsp?tp=&arnumber=1265674>>, Proceedings of the 37th Annual Hawaii International Conference on System Sciences, Jan. 5-8, 2004, pp. 1-10.

"Vlingo", Retrieved at <<http://www.vlingo.com/>>, Retrieved Date: Jan. 7, 2011, pp. 2.

* cited by examiner

MULTI-MODE TEXT INPUT

BACKGROUND

One of the benefits of providing content to users over the Internet and/or via stand-alone applications that consume web-based content is that a relatively consistent user experience can be provided to users via this medium. Specifically, multiple users viewing content using different web browsers and/or different computing platforms may nonetheless have substantially identical experiences because the content is rendered from the same source code and/or interacted with using simple text input.

At the same time, the consistent input mechanisms used to interact with Internet and/or application content can be a limitation as users interact with Internet and/or application content using increasingly diverse devices and/or device platforms. More particularly, users may be limited to interacting with content via text input and/or mouse gestures, though a device used to access the content may lack a mouse and/or a standard keyboard.

It is with respect to these and other considerations that the disclosure made herein is presented.

SUMMARY

Concepts and technologies are described herein for multi-mode text input. In accordance with the concepts and technologies disclosed herein, users can interact with content using various input devices such as microphones or cameras in addition to, or instead of, using standard text input and/or mouse gestures. Input collected using the input devices can be converted into text and submitted to an entity associated with the content to allow interactions with the content to occur via multiple input modes. As such, users can interact with applications and sites via various types of input devices.

According to one aspect, a client device having an input device executes an application. The application is configured to receive content from a source and to analyze the content to determine if the content supports text input and/or if a user can interact with the content via other types of input devices. In some implementations, the determination is made by analyzing the content to identify one or more input indicators. The input indicators can include explicit indicators that the content supports multi-mode text input including, but not limited to, meta tags, flags, or other data that enable the interactions via the various input devices. In other implementations, the input indicators include implicit indicators such as, for example, one or more fields, forms, or other mechanisms by which users interact with the content.

According to another aspect, the application is configured to filter the input captured via the various input devices. The application can filter the input based upon contextual information associated with the content and/or a client device associated with a user submitting the input. Thus, for example, the application can take into account a location of a user or a client device when converting the input to text. If the input is submitted via a microphone or other audio input device, the application can filter the input based upon grammar, accents, dialects, and/or other information to apply contextual information to the speech to text process. Similar filtering can be completed for image to text processes as well, if desired, and location information can be filtered based upon a current location of the user or a client device associated with the user. In other embodiments, mapping applications, address books, and/or other applications or data sources can be used to obtain address information, telephone numbers, and the like.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to concepts and technologies for multi-mode text input. According to the concepts and technologies described herein, content is received at and/or presented on a client device. The content can include one or more explicit or implicit input indicators. The input indicators can indicate to an application executed by the client device that user input can be used in conjunction with consumption or use of the content. The application is configured to recognize the input indicators and to analyze the content to determine context associated with the content and/or the client device executing the application. The application also is configured to determine, based upon the content and/or the contextual information, which input device to use to obtain input associated with use or consumption of the content.

The application also is configured to perform filtering on the input and to generate text based upon the filtered input. Thus, for example, the application can apply grammar, dialect, accent, and/or other information to speech or other audio input when performing a speech to text process. Similarly, images can be captured with a camera, and text can be recognized in the image using optical character recognition, by understanding the content of the image, by converting a logo to text, by reading a bar code or other information in the image, and/or by other processes. Other types of input, input devices, and filtering can be used in accordance with the concepts and technologies disclosed herein. Additionally, in some embodiments an input server executes an application so that conversion of the input to text can be performed remotely from the client device. The text generated by the application can be provided in place of text input and therefore can be submitted without use of a mouse, keyboard, and/or other traditional input devices.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for multi-mode text input will be presented.

Figure 1:
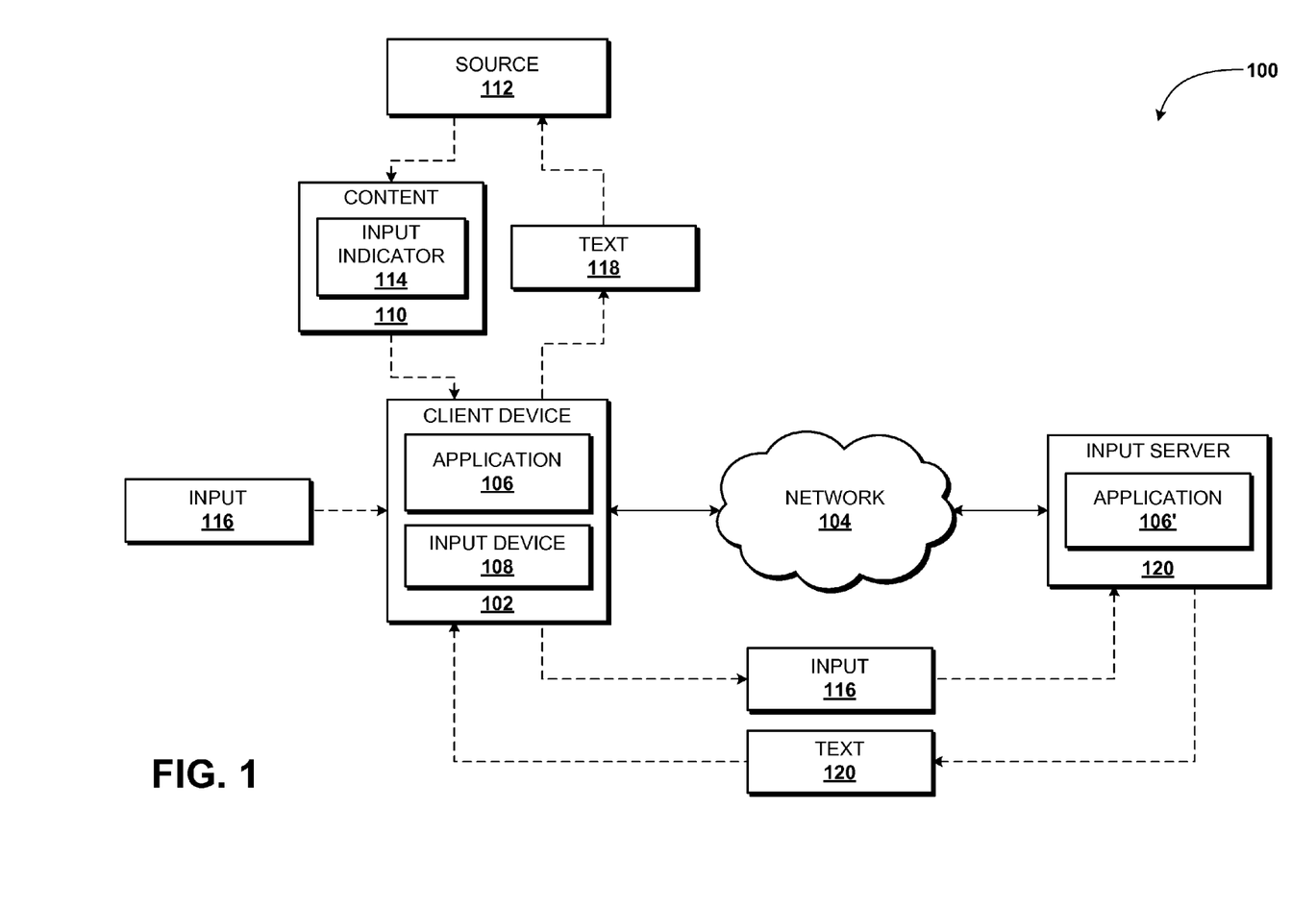
FIG. 1 is a system diagram illustrating an illustrative operating environment for the various embodiments disclosed herein.

Referring now to FIG. 1, aspects of one operating environment 100 for the various embodiments presented herein will be described. The operating environment 100 shown in FIG. 1 includes a client device 102 operating on or in communication with a network 104. According to various embodiments, the functionality of the client device 102 is provided by a mobile computing device such as a smartphone, a mobile telephone, a tablet computer, a netbook computer, a laptop computer, a personal digital assistant ("PDA"), or other device. In other embodiments, the functionality of the client device 102 is provided by a personal computer ("PC") such as a desktop computer system or another computing device such as a server computer, an embedded computer system, a set top box ("STB") or the like. For purposes of illustrating the concepts and technologies disclosed herein, the client device 102 is described as a smartphone. It should be understood that this embodiment is illustrative, and should not be construed as being limiting in any way.

The client device 102 is configured to execute an operating system and one or more application programs such as, for example, an application 106 and/or other application programs. The operating system is a computer program for controlling the operation of the client device 102. The application 106 is an executable program configured to execute on top of the operating system to provide the functionality described herein for providing multi-mode text input. According to various implementations of the concepts and technologies disclosed herein, the application 106 is configured to control one or more input devices 108 associated with the client device 102. According to several illustrative embodiments, the input devices 108 include a microphone, a camera, and/or other types of input devices.

As will be described in more detail herein, the application 106 is configured to receive content 110 from a source 112 such as a website, a server computer, a database, or other systems or devices in communication with the client device 102. In some embodiments, the content 110 corresponds to a web page that is hosted or served by the source 112. As such, the functionality of the source 112 can be provided by one or more web servers or other hosting platforms. In other embodiments, the source 112 can correspond to an application or content hosted or executed by the client device 102. As such, it should be understood that the source 112 can be, but is not necessarily, a remotely executed or accessed source of the content 110. As such, it should be understood that the embodiments illustrated and described herein are illustrative, and should not be construed as being limiting in any way.

The application 106 is configured to analyze the content 110 to determine if the content 110 is configured to support multiple input modes. In particular, the content 110 can include a meta tag, a flag, or other data ("input indicator") 114 for indicating to the application 106 whether or not the content 110 supports functionality for providing multiple modes of text input. In some embodiments, the meta tag or flag can be provided in a syntax associated with hypertext markup language ("HTML"), extensible markup language ("XML"), and/or other languages for coding and/or scripting various web pages, applications, scripts, and/or other types of content. The meta tags also can be provided in other syntaxes and/or formats, if desired.

In other embodiments, the content 110 does not include an explicit indication of whether multiple input modes are supported. As such, the input indicators 114 in the content 110 can include one or more form elements or other elements associated with inputting data into applications, web pages, or other types of files or documents, and the application 106 can determine, based upon contextual information associated with the content 110, whether or not the content 110 can be interacted with via multiple input modes.

If the application 106 determines that the content 110 can be interacted with via multiple input modes, the application 106 can determine what input modes can be supported for interacting with the content 110. More particularly, the application 106 is configured to recognize types of data and/or types of data input associated with the content 110 and/or fields or forms associated with the content 110, and to determine one or more input modes for interacting with the content 110. For example, the application 106 can determine that content 110 includes a form for inputting an address. For example, the application 106 can recognize a form element in the content 110, and can recognize that the form element is associated with an address, for example by recognizing that a value input into the form element is given the label or attribute "address" or other similar label or attribute.

Based upon this determination, the application 106 can determine that in addition to rendering the form element to enable text input, that a microphone for collecting speech input, a camera for collecting image input, and/or an address book or map interface for providing addresses can be provided to enable input of the address via multiple input modes. Thus, the application 106 can be configured to determine if content 110 includes input mechanisms, and if so, what type of input is to be captured. As will be explained in more detail, the application 106 also is configured for filtering the multi-mode input based upon the contextual information associated with the content 110.

The application 106 also is configured to activate and/or control the input device 108 to obtain non-textual input ("input") 116 from a user or other entity. For example, the application 106 is configured to activate a camera to capture one or more images as the input 116, and to convert the one or more images into text input ("text") 118 for submission to an application, website, or other source 112 associated with the content 110. Similarly, the application 106 is configured to activate a microphone to obtain speech or sound as the input 116, and to convert the speech or sound into a text format and to pass text 118 corresponding to the speech to the source 112.

As such, from the perspective of the source 112, the client device 102 interacts with the content 110 via text commands, though in reality a user may interact with the input 116 via multiple input modes such as speech, imaging, address book entries, map locations, and/or other types of input that are converted by the application 106 into the text 118. The application 106 can be configured to activate additional or alternative input devices 108, and as such, it should be understood that the above-mentioned embodiments for interacting with the content 110 are illustrative, and should not be construed as being limiting in any way.

As discussed above, the application 106 can be executed by the client device 102 to provide the functionality described herein. In some embodiments, the application 106 executed by the client device 102 is configured to capture the input 116 and to transmit the input 116 to an input server 120 that executes a server-side application 106'. As such, in some embodiments, the conversion of the input 116 from images, sound, address book information, map information, and/or other types of input to the text 118 can be completed remotely from the client device 102. As such, some embodiments of the concepts and technologies disclosed herein can be used to conserve computing, power, and/or other resources associated with the client device 102. In some embodiments, the input server 120 is configured to return the text 118 to the client device 102 for consumption or use at the client device 102 and/or for communication to the source 112 or another entity associated with the content 110. Although not shown in FIG. 1, the input server 120 can also be configured to communicate the text 118 directly to the source 112, if desired.

According to various implementations, as mentioned above, the application 106 also is configured to filter the input 116 based upon contextual information associated with the client device 102 and/or the content 110. More particularly, the application 106 can be configured to filter the input 116 by altering a vocabulary used by a speech-to-text and/or image-to-text converter based upon various considerations such as, for example, a type of input expected from a user or other entity, an accent, dialect, and/or speech patterns associated with a location at which the client device 102 is operating, local roads or street names, types of fields or form elements associated with a particular data input, combinations thereof, and the like. As such, embodiments of the concepts and technologies disclosed herein can be used to allow filtering of the input 116 to improve the results obtained via use of the application 106. These and other aspects of the application 106 are described below in more detail.

FIG. 1 illustrates one client device 102, one network 104, one source 112, and one input server 120. It should be understood, however, that some implementations of the operating environment 100 include multiple client devices 102, multiple networks 104, multiple sources 112, and/or multiple input servers 120. Thus, the illustrated embodiments should be understood as being illustrative, and should not be construed as being limiting in any way.

Figure 2:
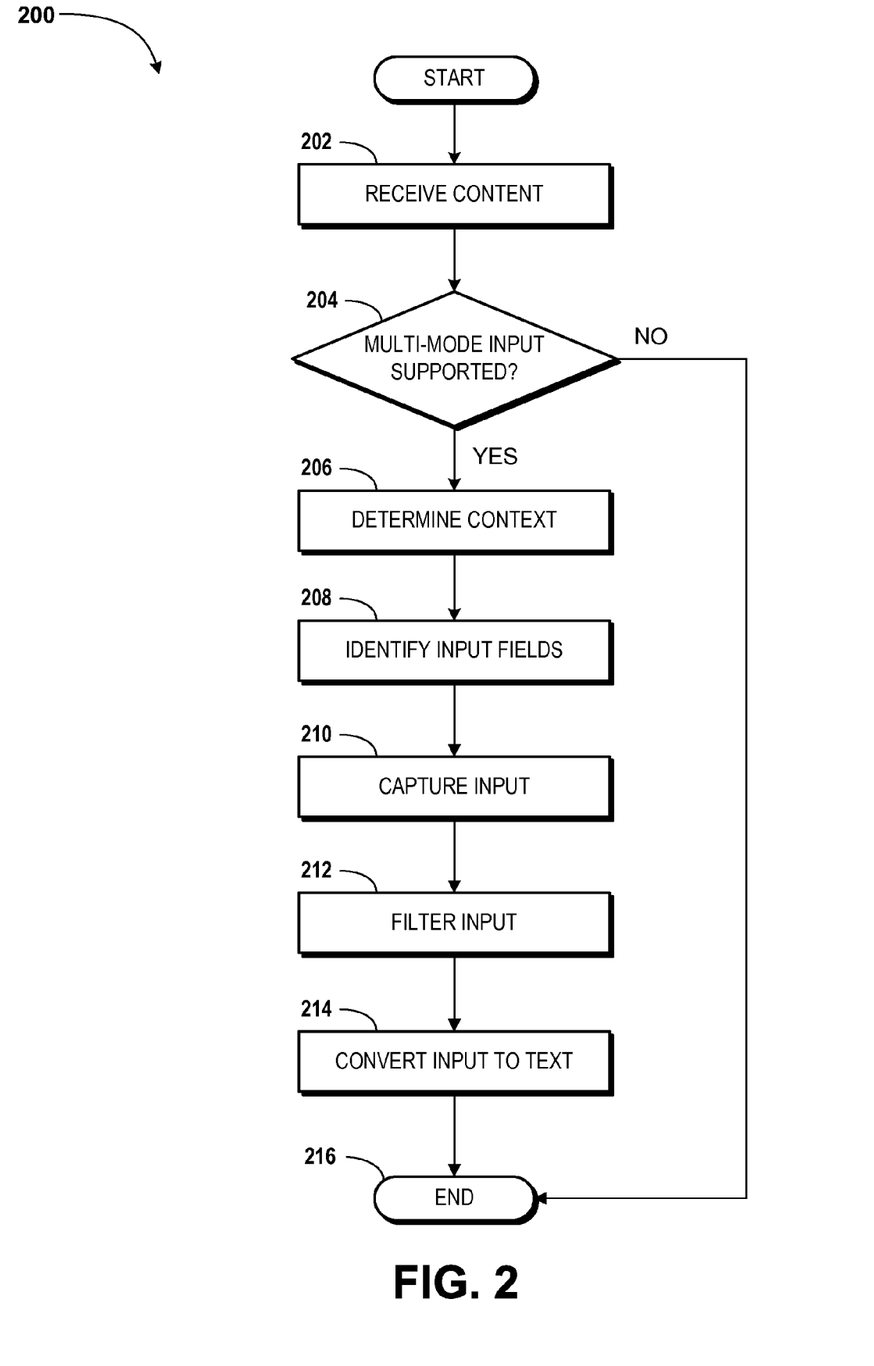
FIG. 2 is a flow diagram showing aspects of a method for providing multi-mode text input, according to an illustrative embodiment.

Turning now to FIG. 2, aspects of a method 200 for providing multimode text input for applications and sites will be described in detail. It should be understood that the operations of the method 200 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 200 can be ended at any time and need not be performed in its entirety. Some or all operations of the method 200, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 200 disclosed herein is described as being performed by the client device 102 via execution of the application 106. As explained above with reference to FIG. 1, in some embodiments the client device 102 interacts with an application 106' executed by the input server 120 to provide the functionality described herein. As such, it should be understood that the embodiments described with reference to FIG. 2 are illustrative, and should not be viewed as being limiting in any way.

The method 200 begins at operation 202, wherein the client device 102 receives content 110. The content 110 can be received from a source 112 such as a web server or other host for providing web pages or applications accessible or executable by the client device 102 and/or other entities. The source 112 also can correspond to an application executed by the client device 102. As such, the content 110 can correspond to a web page, an application page, application data, other types of files, user interfaces ("UIs"), combinations thereof, and the like.

From operation 202, the method 200 proceeds to operation 204, wherein the application 106 determines if the content 110 is configured to allow submission of data as multi-mode input. As mentioned above, the application 106 determines if the content 110 supports multi-mode input in a number of ways. For example, in some embodiments, the application 106 searches the content 110 for an explicit input indicator 114 such as, for example, a meta tag, a flag, or other data indicating that the content 110 supports submission of multi-mode input. In other embodiments, the application 106 determines if the content 110 supports multimode input by searching for an implicit input indicator 114 such as one or more keywords, form elements, and/or other input mechanisms, combinations thereof, and the like that indicate that input is used in conjunction with consumption or use of the content 110. Because other methods of determining if the content 110 and/or the client device 102 support multi-mode input are contemplated, it should be understood that the above-mentioned embodiments are illustrative, and should not be construed as being limiting in any way.

If the application 106 determines, in operation 204, that multi-mode input is supported, the method 200 proceeds to operation 206. At operation 206, the application 106 determines a context associated with the content 110 and/or the client device 102. As mentioned above, the context associated with the content 110 and/or the client device 102 can be used to determine which, if any, of the input devices 108 to activate and/or what types of information should be captured via the input devices 108. Additionally, or alternatively, the context associated with the content 110 and/or the client device 102 can be used to filter input 116 obtained via the input devices 108, as noted above. As noted above, the context can include a location associated with the client device 102, keywords or tags associated with or included in the content 110, names of variables or values associated with form elements in the content 110, combinations thereof, and the like.

From operation 206, the method 200 proceeds to operation 208, wherein the application 106 analyzes the content 110 and identifies one or more input fields in the content 110. For example, if the content 110 corresponds to a web page that includes a form, the application 106 can analyze the web page to identify each input field or other form element in the form. As is generally understood, input fields or other form elements can be identified by tags, flags, and/or other data. As such, the application 106 can identify the input fields in the content 110 by identifying these flags, fields, other form elements, and/or other data. It should be understood that this embodiment is illustrative, and should not be construed as being limiting in any way.

From operation 208, the method 200 proceeds to operation 210, wherein the application 106 captures the input 116 via operation of the input device 108 and/or via enabling capturing of the input 116 via one or more commands issued to the input device 108. For example, in some embodiments, as explained herein, the application 106 is configured to control one or more input devices 108 associated with the client device 102 to obtain the input 116. In other embodiments, the application 106 is configured to command the input devices 108 as to how to capture the input 116. Regardless of how the application 106 interacts with the input devices 108, operation 210 can include capturing the input 116.

From operation 210, the method 200 proceeds to operation 212, wherein the application 106 filters the input 116 received in operation 210. As explained above, the application 106 is configured to filter the input 116 based upon various types of information including, but not limited to, operating information associated with the client device 102 such as a current location of the client device 102, enabled input devices 108 associated with the client device 102, keywords, tags, and/or other data associated with the content 110 received in operation 202, combinations thereof, and the like. Filtering the input 116 can include, for example, restricting or broadening a vocabulary used in speech-to-text conversions and/or image to text conversions such as optical character recognition ("OCR") and/or other processes, restricting street names or other map information based upon a present location, altering the input 116 to reflect accent, dialect, and/or other language differences, combinations thereof, and the like.

From operation 212, the method 200 proceeds to operation 214, wherein the application 106 converts the filtered input 116 to text 118. As noted herein, the input 116 can be converted from audio to text, from an image to text, from a click on a map or other similar interface to coordinates, ZIP codes, location coordinates, combinations thereof, and the like. In one illustrative example, the input 116 can include sound input captured via a microphone of a client device 102, wherein the microphone captured a word pronounced like the word "one." As is known, this word can correspond at least to the words "won" and "one," and the numeral "1." According to various implementations of the concepts and technologies disclosed herein, the contextual information determined in operation 210 is used to determine which word or number is likely intended. For example, if the field into which this word is entered corresponds to a field for collecting data indicating a ZIP code, the application 106 can determine that the user intended to enter the numeral "1," and therefore can filter the input to reflect this expected intention. It should be understood that this embodiment is illustrative, and should not be construed as being limiting in any way.

From operation 214, and/or from operation 204 if the application 106 determines that multi-mode input is not supported, the method 200 proceeds to operation 216. The method 200 ends at operation 216.

Figure 3A:
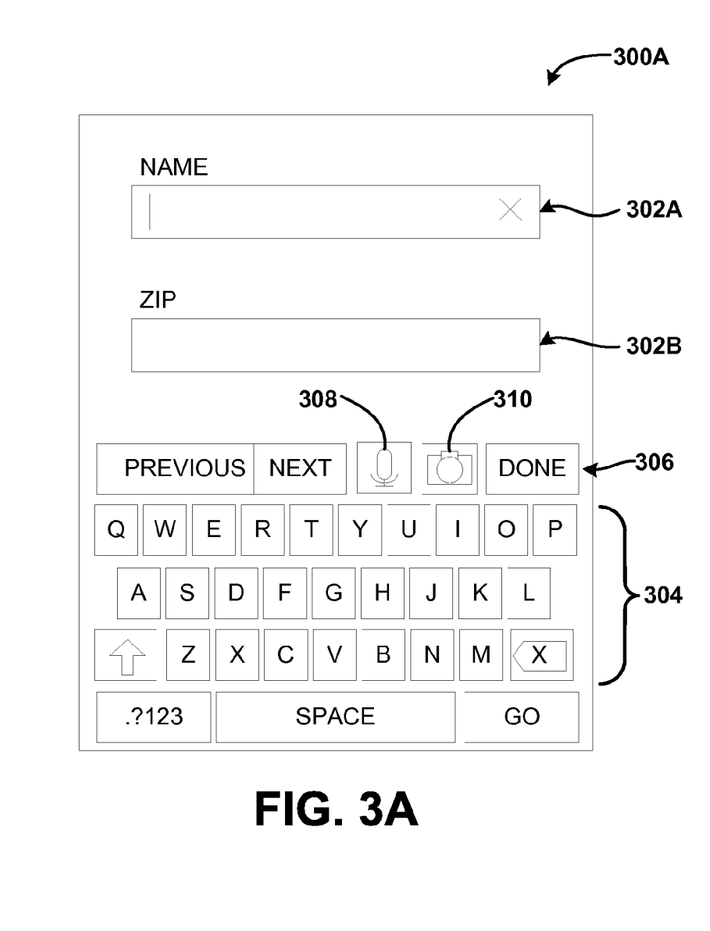
FIGS. 3A-3E are user interface diagrams showing aspects of exemplary user interfaces for providing multi-mode text input, according to various embodiments.

Turning now to FIG. 3A, a user interface diagram showing aspects of a user interface ("UI") for providing multi-mode text input in one embodiment will be described. In particular, FIG. 3A shows a screen display 300A generated by the application 106 according to one particular implementation presented herein. It should be appreciated that the UI diagram illustrated in FIG. 3A is illustrative of one contemplated embodiment, and therefore should not be construed as being limited in any way.

The screen display 300A shown in FIG. 3A is illustrated as displaying a web site, application screen, or other interface including two input fields 302A, 302B. The input field 302A is illustrated as a field for inputting a name, and the input field 302B is illustrated as a field for inputting a ZIP code. It should be understood that this embodiment is illustrative, and should not be construed as being limiting in any way. The screen display 300A also includes a number of UI controls for providing a touchscreen keyboard 304. According to some embodiments, presentation of the touchscreen keyboard 304 can be prompted in response to selecting or otherwise indicating a desire to enter data into one or more of the input fields 302A, 302B.

The screen display 300A also includes a menu area 306 that includes various UI controls for providing various functionality associated with the application 106. In the illustrated embodiment, the menu area 306 includes a UI control 308 for accessing a microphone mode of input, the selection of which causes the application 106 to enable or control operation of the microphone to capture sound as the input 116. The menu area 306 also includes a UI control 310 for accessing a camera, the selection of which causes the application 106 to enable or control operation of the camera to capture one or more images as the input 116. Illustrative user interfaces for capturing sound, images, and map information and converting these types of input to data are illustrated and described below with reference to FIGS. 3B, 3C, and 3E.

Figure 3B:
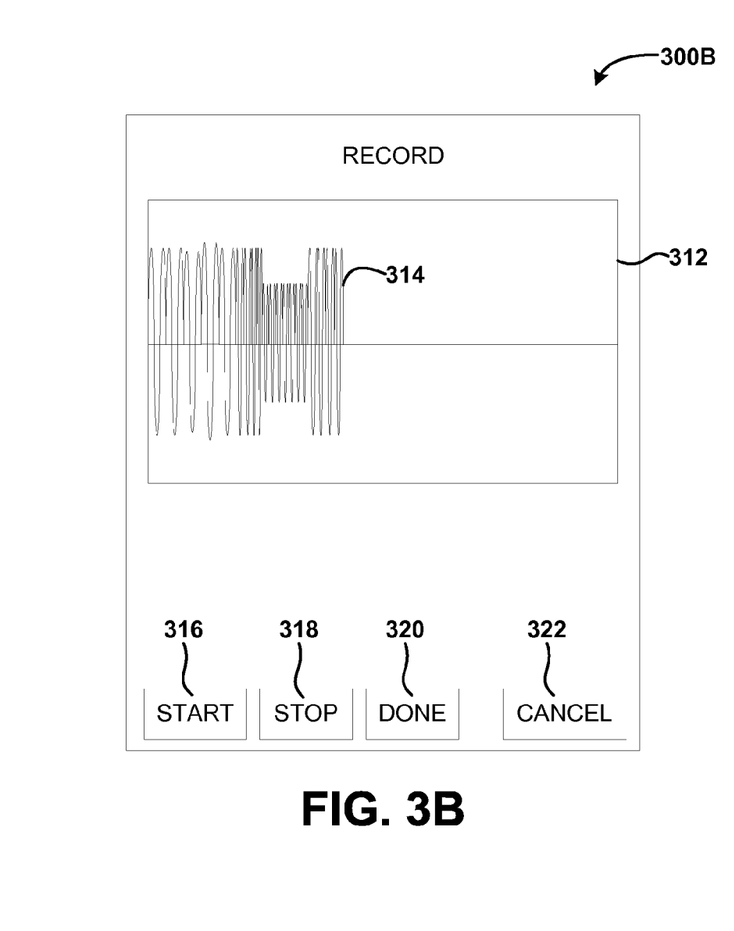

Turning to FIG. 3B, a screen display 300B generated by the application 106 is illustrated, according to an illustrative embodiment. In some embodiments, the screen display 300B is presented by the application 106 in response to selection of the UI control 308 illustrated in FIG. 3A, though this is not necessarily the case. The screen display 300B includes a monitor area 312 for displaying a waveform 314 or other visual representation associated with captured audio, though this is not necessarily the case. In some embodiments, the monitor area 312 is used to provide feedback to the user or other entity, though in some embodiments such feedback is not desired or needed, and therefore may be omitted. In the illustrated embodiment, a user is actively recording sound, and the waveform 314 associated with the captured audio is displayed in the monitor area 312 as the audio is captured. It should be understood that this embodiment is illustrative, and should not be construed as being limiting in any way.

The screen display 300B also includes a UI control 316 for starting recording, the selection of which causes the application 106 to begin recording audio. The screen display 300B also includes a UI control 318 for stopping recording of the audio, the selection of which causes the application 106 to stop recording audio. The screen display 300B also includes a UI control 320 for indicating that recording of audio is complete and/or a UI control 322 for cancelling recording of the audio. It will be appreciated that the screen display 300B can be provided to provide feedback to a user during recording of audio and/or to allow a user to control recording of the audio. In some embodiments, the application 106 is configured to record audio and stop recording of the audio automatically, without the presentation of the screen display 300B. As such, the illustrated embodiment should be understood as being illustrative.

Figure 3C:
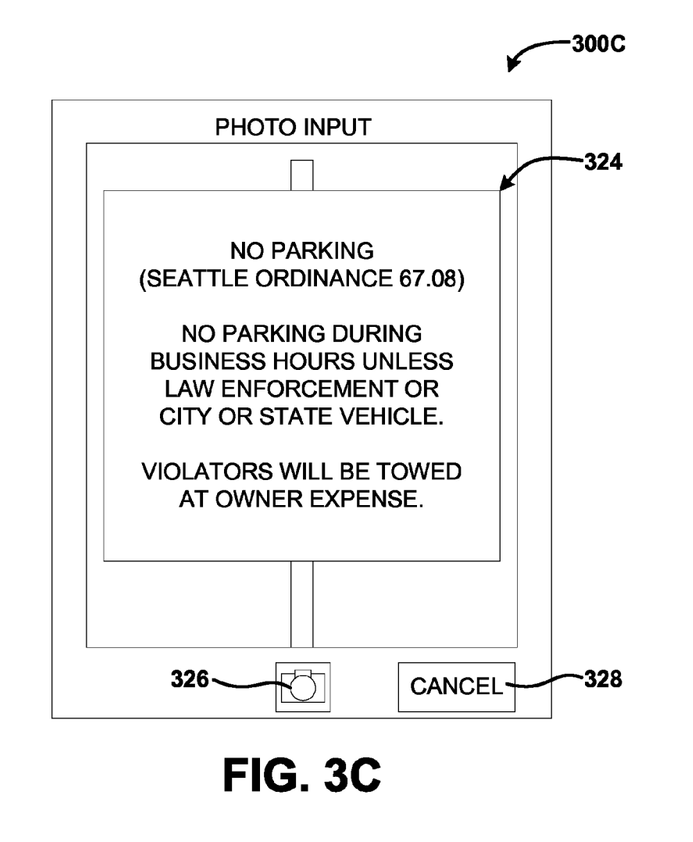

Turning to FIG. 3C, a screen display 300C generated by the application 106 is illustrated, according to an illustrative embodiment. In some embodiments, the screen display 300C is presented by the application 106 in response to selection of the UI control 310 illustrated in FIG. 3A, though this is not necessarily the case. The screen display 300C includes a viewfinder area 324 for displaying an image being captured by the input device 116. In the illustrated embodiment, a user is pointing an image capture device of the client device 102, for example a camera, at a sign to capture text displayed on the sign. It should be understood that this embodiment is illustrative, and should not be construed as being limiting in any way. The screen display 300C also includes a UI control 326 for capturing an image or images and a UI control 328 for cancelling capturing of the one or more images.

Figure 3D:
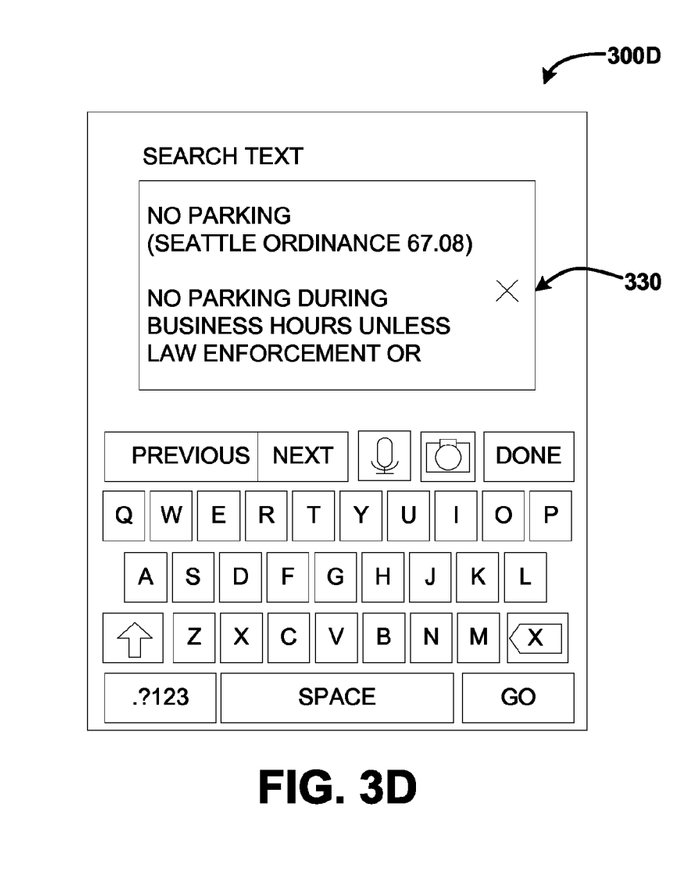

Turning now to FIG. 3D, a screen display 300D generated by the application 106 is illustrated, according to an illustrative embodiment. In some embodiments, the screen display 300D is presented by the application 106 in response to selection of the UI control 326 illustrated in FIG. 3C, though this is not necessarily the case. After capturing an image having text or other visual information, the image is passed to the application 108 for completion of an OCR or other text recognition or text extraction procedure. In the illustrated embodiment, the screen display 300D is displaying a web page having a search field, and the application 106 uses a photo input mode to populate the search field. The screen display 300D includes a search field 330 for entering, editing, and/or displaying text corresponding to a search string. In the illustrated embodiment, the search string corresponds to text recognized in an image captured by the client device 102, for example, the sign illustrated in the viewfinder 324 shown in FIG. 3C. It should be understood that this embodiment is illustrative, and should not be construed as being limiting in any way.

Furthermore, as shown in FIG. 3D, the keyboard 304 illustrated in FIG. 3A can again be displayed in FIG. 3D. As such, some embodiments support editing of captured and/or filtered text 118 during or after capturing the input 116 as disclosed herein. It should be understood that the embodiment shown in FIG. 3D is illustrative, and should not be construed as being limiting in any way.

Figure 3E:
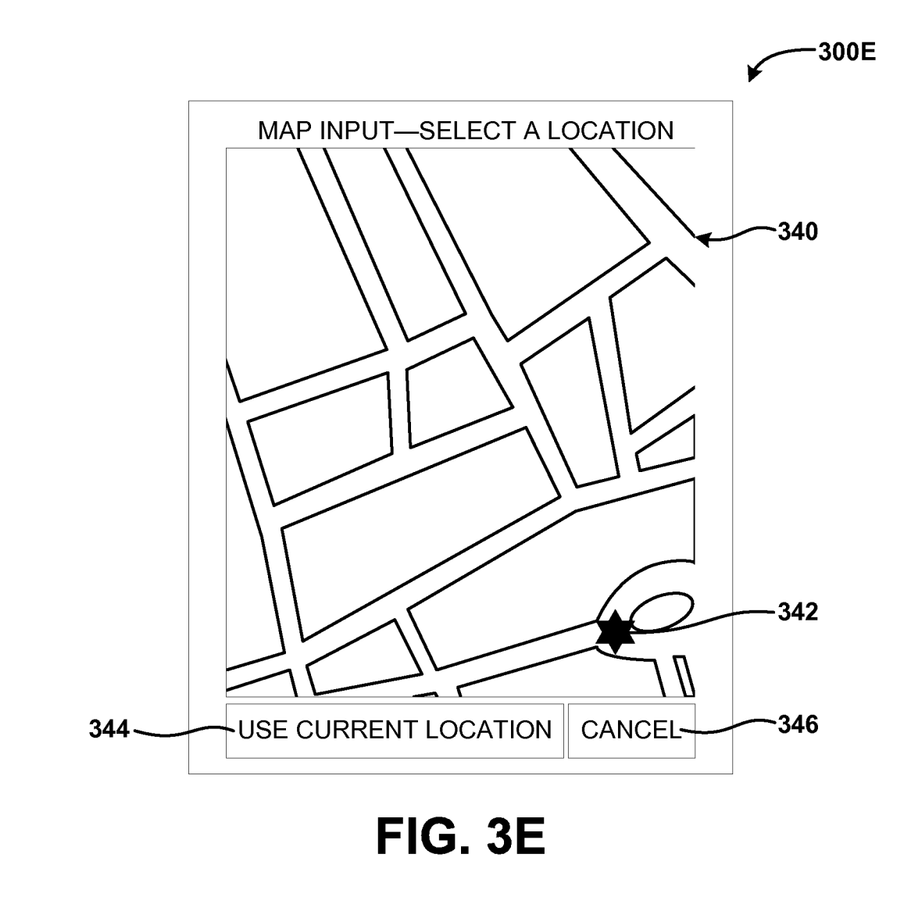

Turning now to FIG. 3E, a screen display 300E generated by the application 106 is illustrated, according to an illustrative embodiment. In some embodiments, the screen display 300E is presented by the application 106 in response to selection of a UI control for providing input via selection of a location on a map, though this is not necessarily the case. The screen display 300E includes a map display 340 for displaying a map. Although not shown in the embodiment illustrated in FIG. 3E, it should be understood that the map display 340 can include zoom controls, panning controls, and/or other controls for manipulating the displayed map, if desired.

In addition to displaying a map, the map display 340 also can display a current location indicator 342. The screen display 300E also includes a UI control 344 for entering location using a current location detected or known by the client device 102 and a UI control 346 for cancelling providing input via selection of allocation on a map. In the illustrated embodiment, a user selects a point on the map display 340 by touching the screen of the client device 102 at the point. In response to touching the screen of the client device 102 at the point, the application 106 determines coordinates, a street address, and/or another indication of location corresponding to the selected point. The coordinates, street address, and/or other indication can be converted to the text 118, as explained herein, and the text 118 can be submitted.

Figure 4:
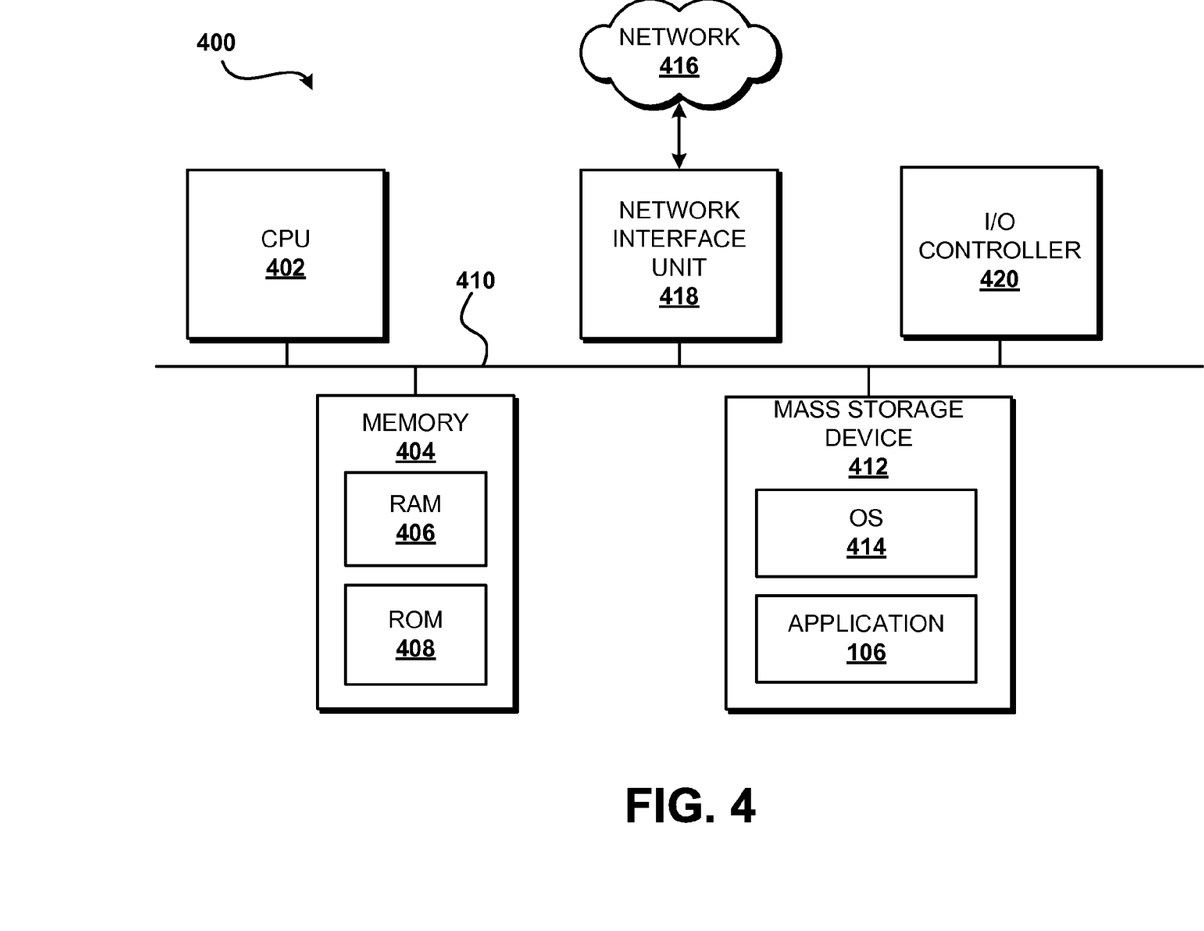
FIG. 4 is a computer architecture diagram illustrating an illustrative computer hardware and software architecture for a computing system capable of implementing aspects of the embodiments presented herein.

FIG. 4 illustrates an illustrative computer architecture 400 for a device capable of executing the software components described herein for providing multi-mode text input. Thus, the computer architecture 400 illustrated in FIG. 4 illustrates an architecture for a server computer, mobile phone, a PDA, a smart phone, a desktop computer, a netbook computer, a tablet computer, a laptop computer, and/or other devices described herein with respect to the client device 102 and/or the input server 120. The computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 414 and the application 106. Although not shown in FIG. 4, the mass storage device 412 also can be configured to store the application 106', if desired.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium" and variations thereof, does not include waves, signals, and/or other transitory and/or intangible communication media, per se.

According to various embodiments, the computer architecture 400 may operate in a networked environment using logical connections to remote computers through a network such as the network 104. The computer architecture 400 may connect to the network 104 through a network interface unit 416 connected to the bus 410. It should be appreciated that the network interface unit 416 also may be utilized to connect to other types of networks and remote computer systems, for example, the source 112, the input server 120, and/or other networks, systems, devices, and/or other entities. The computer architecture 400 also may include an input/output controller 418 for receiving and processing input from a number of other devices, including a keyboard, mouse, or electronic stylus (not shown in FIG. 4). Similarly, the input/output controller 418 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Based on the foregoing, it should be appreciated that technologies for multi-mode text input have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for interacting with content, the computer-implemented method comprising performing computer-implemented operations for:
   receiving, at a computer, the content from a source;
   identifying at least one input indicator in the content, the at least one input indicator indicating that the content supports multi-mode input, the input indicator including explicit meta tags, flags, implicit keywords, or form elements, the input indicator associated with a form element;
   determining a content associated with the form element if the input indicator indicates that the form element supports multi-mode input;
   determining a type of information to be captured from a plurality of types of information by the computer based on the context for the form element;
   activating one or more non-textual input devices associated with the computer according to the type of information to be captured;
   capturing multi-mode input, via the one or more non-textual input devices, for interacting with the content, wherein the multi-mode input includes one or more of camera, speech, and touch input; and converting the multi-mode input to text.

2. The method of claim 1, further comprising submitting the text to the source.

3. The method of claim 1, further comprising determining if the content is configured to support multi-mode input.

4. The method of claim 3, wherein identifying the at least one input indicator comprises analyzing the content to identify a meta tag in the content, the meta tag enabling the multi-mode input.

5. The method of claim 3, wherein identifying the at least one input indicator comprises identifying at least one input field in the content, analyzing the at least one input field to identify a type of input, and determining that a non-textual input device is available for entering the input.

6. The method of claim 1, wherein the context indicates which the one or more non-textual input devices is to be used to capture the non-textual input.

7. The method of claim 1, further comprising filtering the multi-mode input based, at least partially, upon the context.

8. The method of claim 7, wherein the one or more non-textual input devices comprise a microphone for capturing audio, and wherein converting the input to text comprises using a speech-to-text converter to generate the text based upon the audio.

9. The method of claim 8, wherein filtering the multi-mode input comprises modifying a vocabulary associated with the speech-to-text converter.

10. The method of claim 7, wherein the one or more non-textual input devices comprise a camera for capturing an image, and wherein converting the input to text comprises using an optical character recognition process to generate the text based upon the image.

11. The method of claim 10, wherein filtering the multi-mode input comprises modifying a vocabulary associated with the optical character generation process.

12. The method of claim 1, wherein the multi-mode input includes map information, the map information including a street address having a zip code.

13. A computer-implemented method for interacting with content, the computer-implemented method comprising performing computer-implemented operations for:

receiving the content from a source;

identifying at least one input indicator in the content, the at least one input indicator indicating that the content supports multi-mode input, the input indicator including explicit meta tags, flags, implicit keywords, or form elements, the input indicator associated with a form element;

determining a context associated with the form element if the input indicator indicates that the form element supports multi-mode input;

determining a type of information to be captured from a plurality of types of information by the computer based on the context for the form element;

activating one or more non-textual input devices associated with the computer according to the type of information to be captured;

capturing multi-mode input, via the one or more non-textual input devices, for interacting with the content, wherein the multi-mode input includes one or more of camera, speech, and touch input;

converting the multi-mode input to text; and submitting the text to the source.

14. The method of claim 13, further comprising determining if the content is configured to support multi-mode input.

15. The method of claim 13, wherein identifying the at least one input indicator comprises analyzing the content to identify a meta tag in the content, the meta tag enabling the multi-mode input.

16. The method of claim 13, wherein identifying the at least one input indicator comprises identifying at least one input field in the content, analyzing the at least one input field to identify a type of input, and determining that a non-textual input device is available for entering the input.

17. The method of claim 13, further comprising:

filtering the multi-mode input based at least partially, upon the context.

18. A computer storage medium having computer readable instructions stored thereupon that, when executed by a computer, cause the computer to:

receive content from a source, the content including one or more of webpages or application pages;

identify at least one input indicator in the content, the at least one input indicator indicating that the content supports multi-mode input, the input indicator including explicit meta tags, flags, implicit keywords, and/or form elements, the input indicator associated with a form element;

determine a context associated with the form element;

determine that the form element is configured to support interactions via multi-mode input;

determine a type of information to be captured from a plurality of types of information by the computer based on the context for the form element;

activate one or more non-textual input devices associated with the computer according to the type of information to be captured;

capture the multi-mode input, via the activated input device, for interacting with the content, wherein the multi-mode input includes one or more of camera, speech, and touch input;

convert the multi-mode input to text; and submit the text to the source.

19. The computer storage medium of claim 18, further comprising computer readable instructions that, when executed by a computer, cause the computer to:

filter the multi-mode input based, at least partially, upon the context.

20. The computer storage medium of claim 18, wherein identifying the at least one input indicator comprises analyzing the content to identify a meta tag in the content, the meta tag enabling the multi-mode input.

* * * * *